United States Patent
Paul et al.

(10) Patent No.: US 6,410,627 B1
(45) Date of Patent: *Jun. 25, 2002

(54) USE OF HIGH HYDROXYL COMPOUNDS FOR WATER SENSITIVE HOT MELT ADHESIVES

(75) Inventors: Charles W. Paul, Madison; Mitchell J. Blumenthal, Belle Mead, both of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/289,025

(22) Filed: Apr. 9, 1999

(51) Int. Cl.$^7$ .............................. C08L 91/06; C08F 20/00
(52) U.S. Cl. ................ 524/277; 524/221; 524/227; 524/230; 524/297; 524/313; 524/488; 525/64; 525/79; 525/167; 525/444
(58) Field of Search ................ 525/167, 64, 79, 525/444; 524/297, 313, 230, 221, 227, 277, 488

(56) References Cited

U.S. PATENT DOCUMENTS

| | | | |
|---|---|---|---|
| 4,052,368 A | 10/1977 | Larson | 528/293 |
| 4,073,777 A | 2/1978 | O'Neill et al. | 528/295 |
| 4,143,022 A * | 3/1979 | Iger | 523/139 |
| 4,233,196 A | 11/1980 | Sublett | 524/602 |
| 4,257,928 A | 3/1981 | Vachon et al. | 528/295 |
| 4,304,901 A | 12/1981 | O'Neill et al. | 528/290 |
| 4,525,524 A | 6/1985 | Tung et al. | 524/601 |
| 4,575,525 A | 3/1986 | Wacome et al. | 524/48 |
| 4,598,142 A | 7/1986 | Hilbert et al. | 528/295 |
| 4,678,824 A | 7/1987 | Lauria | 524/48 |
| 4,735,843 A | 4/1988 | Noda | 428/137 |
| 4,910,292 A | 3/1990 | Blount | 528/272 |
| 4,973,656 A | 11/1990 | Blount | 528/272 |
| 4,990,593 A | 2/1991 | Blount | 528/272 |
| 5,098,962 A | 3/1992 | Bozich | 525/437 |
| 5,143,961 A | 9/1992 | Scholl et al. | 524/317 |
| 5,177,134 A | 1/1993 | Mullen, III et al. | 524/284 |
| 5,262,481 A | 11/1993 | Jammet | 525/125 |
| 5,296,535 A | 3/1994 | Nesiewicz et al. | 524/446 |
| 5,340,863 A | 8/1994 | Krutzel | 524/272 |
| 5,356,963 A | 10/1994 | Kauffman et al. | 524/43 |
| 5,360,845 A | 11/1994 | Billmers et al. | 524/51 |
| 5,380,779 A | 1/1995 | D'Haese | 524/272 |
| 5,382,652 A | 1/1995 | Fukuda et al. | 528/308.6 |
| 5,387,623 A | 2/1995 | Ryan et al. | 523/124 |
| 5,391,434 A | 2/1995 | Krutzel | 428/412 |
| 5,439,896 A * | 8/1995 | Ito et al. | 524/539 |
| 5,459,184 A | 10/1995 | Bunnelle et al. | 524/221 |
| 5,532,306 A | 7/1996 | Kauffman et al. | 524/274 |
| 5,543,488 A | 8/1996 | Miller et al. | 528/277 |
| 5,552,411 A | 9/1996 | Downing et al. | 514/312 |
| 5,552,495 A | 9/1996 | Miller et al. | 525/437 |
| 5,571,876 A | 11/1996 | Miller et al. | 525/437 |
| 5,574,076 A | 11/1996 | Sharak et al. | 523/128 |
| 5,583,187 A | 12/1996 | Sharak et al. | 525/438 |
| 5,605,764 A | 2/1997 | Miller et al. | 428/480 |
| 5,718,790 A | 2/1998 | Miller et al. | 156/155 |
| 5,750,605 A | 5/1998 | Blumenthal et al. | 524/230 |
| 5,760,135 A | 6/1998 | Korpman et al. | 525/95 |
| 5,852,080 A * | 12/1998 | Philbin | 524/320 |
| 5,863,319 A * | 1/1999 | Baker et al. | 106/31.29 |
| 6,001,910 A * | 12/1999 | Blumenthal et al. | 524/277 |

FOREIGN PATENT DOCUMENTS

| | | | |
|---|---|---|---|
| JP | 6329992 | 11/1994 | |
| WO | WO 95/05413 | 2/1995 | C08G/63/688 |
| WO | WO 95/18191 | 7/1995 | C09J/167/00 |
| WO | WO 96/07540 | 3/1996 | B32B/15/08 |

OTHER PUBLICATIONS

Petrolite Corporation V. Watson, Comr. Pats., 1957.*
Austenal Laboratories Incorporated v. Nobilium Processing Company of Chicago et al., 1957.*
Paten Abstracts of Japan, Publication No. 08183941, Publication Date Jul. 16, 1996, Title: Tackifier For Ethylene–Based Copolymer And Hot Melt Adhesive Composition.
Paten Abstracts of Japan, Publication No. 10152666, Publication Date Jun. 9, 1998, Title: Adhesive, Adhesive For Molded Lignocellulose Plate, Molded Lignocellulose Plate, And Their Production.

* cited by examiner

Primary Examiner—Peter Szekely
(74) Attorney, Agent, or Firm—Cynthia L. Foulke

(57) ABSTRACT

A hot melt adhesive composition comprising (a) greater than 40% by weight of a polymeric component; and (b) 5 to 40% by weight of a high hydroxyl number compound, with hydroxyl number greater than 100 mg KOH/g.

15 Claims, No Drawings

USE OF HIGH HYDROXYL COMPOUNDS FOR WATER SENSITIVE HOT MELT ADHESIVES

BACKGROUND OF THE INVENTION

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs.

For various applications, such paper bonding applications including tissue/towel lamination, roll wrap, bag ending, and moisture activated front seals for envelopes, it is also desired that some hot melt adhesives be water-dispersible.

SUMMARY OF THE INVENTION

We have now found that the use of high hydroxyl compounds, which function as tackifiers in hot melt adhesive formulations, at high levels, >10%, provide hot melts with improved water sensitivity compared to hot melts formulated with conventional tackifiers. These compounds find particular use in hot melt adhesives based on sulfonated polyesters and graft copolymers of vinyl monomers and polyalkylene oxide polymers.

Thus, in its broadest aspect, the present invention is directed to hot melt adhesive compositions comprising a sulfonated polyester or a graft copolymer of at least one vinyl monomer and at least one polyalkylene oxide polymer; and a high hydroxyl number compound.

It will be recognized that the general formulations described above can be adapted to include a wide variety of hot melt adhesive compositions, the more precise formulations of which will vary depending upon the specific end use, as known to those skilled in the particular art.

DETAILED DESCRIPTION OF THE INVENTION

The present invention is directed to hot melt adhesive compositions, with improved water sensitivity, comprising a sulfonated polyester or a graft copolymer of at least one vinyl monomer and at least one polyalkylene oxide polymer; and a high hydroxyl number compound.

The high hydroxyl compound aids in the water dispersibility of the hot melt adhesive formulation. Specifically, the compounds described here will provide the adhesives of the present invention with improved water sensitivity, as compared to hot melt adhesives formulated with conventional tackifiers (rosin and rosin derivatives, terpene phenolics, and α-methyl styrene). Water sensitive adhesives may be used in remoistenable and repulpable applications, or in wetness indicator adhesives.

The compounds of the present invention are solid high hydroxyl materials with a hydroxyl number >100 mg KOH/g. The compounds are amorphous, with a low melt viscosity and a softening point above room temperature. Preferred compounds are styrene allyl alcohol copolymers available from ARCO Chemical under the tradename SAA-100 with an hydroxyl number of 210 mg KOH/g and orthophthalate neopentyl glycol polyester polyol available from Stepan under the tradename Stepanol PN-110 with a hydroxyl number of 110 mg KOH/g. These compounds form miscible blends with sulfonated polyester base polymers and polyethylene glycol grafted polyvinyl acetate base polymers. The compounds are present in an amount of 5 to 40%, preferably 10 to 35% by weight of the adhesive.

The polymeric component of the present adhesive formulation is any polymer suitable for use in formulating hot melt adhesives. Preferred are the sulfonated polyesters, or a graft copolymers of vinyl monomers and polyalkylene oxide polymers. The polymeric component is present in the adhesive compositions in an amount greater than 40% by weight, preferably 60% by weight.

The sulfonated polyester component of the present invention is a condensation polymer comprising the reaction product of:

(a) at least one difunctional dicarboxylic acid or corresponding methyl ester which is not a sulphomonomer;

(b) 2 to 25 mole percent of at least one sulphomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

(c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbons atoms;

(d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (e) 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of (equivalents) EQ (base) divided by (equivalents) EQ (acid) is between 0.5 and 2.

The difunctional acid or ester reactant of (a) of the composition of the present invention is preferably substantially aliphatic in nature and may be an acid selected from the group consisting of oxalic; malonic; dimethylmalonic; succinic; glutaric; adipic; trimethyladipic; pimelic; pivalic; fumaric; maleic; dodecanoic; 2,2-dimethylglutaric; azelaic; sebacic; 1,3-cyclopentane-dicarboxylic; 1,2-cyclohexanedicarboxylic; 1,3-cyclohexane dicarboxylic; 1,4-cyclo-hexanedicarboxylic; phthalic; terephthalic; isophthalic; 2,5-norbornane-dicarboxylic; 1,3-naphthalic; diphenic; 4,4'-oxydibenzoic; diglycolic; thiodipropionic; 4,4'-sulfonyldibenzoic; and 2,5-naphthalenedicarboxylic acids and esters thereof and mixtures thereof. The difunctional dicarboxylic acid or ester reactant of (a) is preferably selected from the group of acids consisting of isophthalic acid, terephthalic acid, phthalic anhydride (acid), adipic acid, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, and glutaric acid and esters thereof and mixtures thereof. The more preferred difunctional dicarboxylic acid reactants of (a) are selected from the group consisting of isophthalic acid, adipic acid, 1,4-cyclohexanedicarboxylic acid, 1,3-cyclohexanedicarboxylic acid and mixtures thereof with 1,4-cyclohexanedicarboxylic acid being most preferred.

The sulphomonomer reactant of (b) is preferably selected from the group consisting of difunctional monomers containing a —$SO_3M$ group attached to a nucleus selected from the group consisting of benzene, naphthalene, anthracene, diphenyl, oxydiphenyl, sulfonyldiphenyl, and methylenediphenyl, wherein M is $Na+$, $Li+$, $Mg++$, $Ca++$, $Fe++$, and $Fe+++$. The more preferred sulfomonomer reactant of (b) is selected from the group consisting of diols an diol adducts of multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus. Alternatively, a more preferred group of sulfomonomers include 5-sodiosulfoisophthalic acid, dimethyl 5-sodiosulfoisophthalate, 5-lithiosulfoisphthalic acid, and bis(2-hydroxyethyl)-5 -sodiosulfoisophthalate; with the 5-sodiosulfoisophthalic acid or dimethyl 5-sodiosulfoisophthalate being most preferred.

The difunctional reactant of (c) is preferably a diol selected from the group consisting of ethylene glycol; propylene glycol, 1,3-propanediol, 2-methyl-1,3-propanediol, 2,4-dimethyl-2-ethyl-hexane-1,3-diol, 2,2-dimethyl-1,3-propanediol (neopentyl glycol), 2-ethyl-2-butyl-1,3-propanediol (neopentyl glycol), 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6 -hexanediol, thiodiethanol, 1,2-cyclohexanedimethanol, 1,3-cyclohexane-dimethanol, 1,4-cyclohexanedimethanol, 2,2,4,4-tetramethyl- 1,3-cyclobutanediol, p-xylylenediol, diethylene glycol, triethylene glycol, tetraethylene glycol, pentaethylene glycol, hexaethylene glycol, heptaethylene glycol, octaethylene glycol, nonaethylene glycol, decaethylene glycols, 2,2,4-trimethyl-1-1,3-pentanediol, hydroxypivalyl hydroxypivalate, dipropylene glycol, 1,10-decanediol, hydrogenated bisphenol A, and mixtures thereof. The difunctional reactant of (c) is more preferably selected from the group consisting of diethylene glycol; neopentyl glycol, cyclohexanedimethanol, 2-ethyl-2-butyl-1,3-propanediol, 2,2,4-trimethyl-1,3-pentanediol, hydroxypivalyl hydroxypivalate, and 2-methyl-1,3-propanediol, with diethylene glycol, neopentyl glycol, and cyclohexanedimethanol being most preferred.

Advantageous difunctional components which are aminoalcohols include aromatic, aliphatic, heterocyclic and other types as in regard to component (d). Specific examples include 5-aminomethyl-cyclohexane-methanol; 5-amino-2-ethyl-pentanol-1, 2-(4-b-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$C(R)_2$—OH group.

Advantageous difunctional monomer components which are aminocarboxylic acids include aromatic aliphatic, heterocylic, and other types as in regard to component (d) and include lactams. Specific examples include 6-aminocaproic acid, its lactam known as caprolactam, omega-aminoundecanoic acid, 3-amino-2-dimethylpropionic acid, 4-(b-aminoethyl)-benzoic acid, 2 -(b-aminopropoxy) benzoic acid, 4-aminomethlcyclohexanecarboxylic acid, 2-(b-aminopropoxy) cyclohexanecarboxylic acid, etc. Generally these compounds contain from 2 to 20 carbon atoms.

Advantageous examples of difunctional monomer component (d) which are diamines include ethylene-diamine; hexamethylenediamine; 2,2,4-trimethylhexamethylenediamine; 4-oxaheptane-1,7-diamine; 4,7-dioxadecane-20 1,10-diamine; 1,4-cyclohexanebismethylamine; 1,3-cycloheptamethylene-diamine; dodecamethylenediamine, etc.

Reactant (e), when used, preferably contains 3 to 6 hydroxyl and/or carboxyl groups; more preferred is trimethylolpropane (TMP), trimethylolethane (TME), glycerine, pentaerythritol, arytritol, threitol, dipentaerythritol, sorbitol, trimellitic anhydride, pyromellitic dianhydride, or dimethylolpropionic acid, with TMP being most preferred. It is preferred that reactant (e) be present in a minor amount up to 40 mole percent, more preferred 0 to 20 mole percent.

The polyester composition used as a component of the hot melt adhesives of the present invention preferably comprises 60 to 100 mole percent of (a), 4 to 20 mole percent of (b), 80 to 100 mole percent of (c), 0 to 10 mole percent of (d), and 0 to 20 mole percent of (e).

In other more preferred embodiments of the invention the polyester comprises 60 to 100 mole percent of 1,4-cyclohexanedicarboxylic acid; 4 to 20 mole percent of 5-sodiosulfoisophthalic acid or dimethyl 5-sodiosulfoisophthalate; and 80 to 100 mole percent of diethylene glycol, neopentyl glycol or cyclohexanedimethanol.

The use of sulfonated polyester confers the additional advantage of providing a degree of water sensitivity which is dependent on the ionic strength of the aqueous environment. Thus, adhesives can be formulated which are sufficiently resistant to the ionic environments encountered during use (such as the exposure to bodily fluids encountered in diapers and feminine napkins) yet still disperse and/or debond in tap water, which is of lower ionic strength. These adhesives are therefore particularly useful in constructing flushable disposable articles.

Hot melt adhesives based on sulfonated polyesters are described in U.S. Pat. No. 5,750,605. The preparation of the polyesters used herein is generally described, for example, in U.S. Pat. Nos. 4,910,292, 4,973,656, and 4,990,593.

The preferred polycondensation reactant conditions for the preparation of the polyester are at a temperature of 150 to 230° C. in the presence of a catalyst. The catalyst for the polycondensation reaction is preferably an acid catalyst more preferably an organo-metallic compound, such as a tin or titanium containing compound. Suitable examples of the acid catalyst include dibutyltinoxide, stannous oxalate, titaniumtetraisopropoxide, butylstannoic acid, and p-toluenesulfonic acid, with butylstannoic acid being most preferred. A preferred butylstannoic acid catalytic amount is 0 to 0.5 weight percent, based on the total weight of reactants, preferably 0.01 to 0.2 weight percent, with 0.1 weight percent being most preferred.

The viscosity of the polyester is preferably between 1000 cP and 1,000,000 cP at 350° F., most preferably between 5000 and 60,000 cP. Viscosity is measured in a Brookfield viscometer using a #27 spindle. Viscosity is generally related to molecular weight with higher viscosities corresponding to higher molecular weights.

In another embodiment, the polymeric component of the hot melt adhesives of the present invention are based on graft copolymer comprising about 40 to 85 weight percent of at least one vinyl monomer and about 15 to 60 weight percent of at least one polyalkylene oxide polymer.

The graft copolymers used herein are actually mixtures of graft and homopolymers of the respective monomers. For convenience these graft copolymer/homopolymer mixtures will be referred to as "graft copolymers" throughout the specification and claims. The preferred vinyl monomer used in the graft copolymer is vinyl acetate or an alkyl-substituted acrylate such as methyl acrylate or ethyl acrylate or mixtures thereof. The preferred polyalkylene oxide is a polyethylene oxide homo-or-copolymer with a molecular weight of 3,000 to 100,000. The most preferred is a polyethylene glycol grafted polyvinyl acetate polymer.

The specific water-soluble polyalkylene oxide polymers used in the graft copolymers described herein have a molecular weight of about 3,000 to 100,000 and a polymerized ethylene oxide content of at least 50% by weight. The polyalkylene oxide polymers may be homopolymers of ethylene oxide (including the ester and ether derivatives thereof, random copolymers of ethylene and propylene oxide, block copolymers of ethylene and propylene oxides, or mixtures thereof. It will be noted that mixtures of different polyalkylene oxide polymers may be utilized, and copolymers and homopolymers may be used together in such mixtures. The polymers are commercially available from companies such as Union Carbide (the polyethylene oxide polymers, poly (ethylene oxide/propylene oxide) copolymers and monomethyl ethers of polyethylene oxide), BASF Wyandotte (the block copolymers) and Dow Chemical Company (the homopolymers and random copolymers). More specifically, the Union Carbide products sold under the trade names CARBOWAX (for polyethylene oxides) and METHOXY CARBOWAX (for the monomethyl ethers of polyethylene oxide) have an average molecular weight roughly indicated by the numeral following the trade name.

The polymerized ethylene oxide content of the polyalkylene oxide polymer should be at least 50% by weight of the polymer and preferably at least 75%. Polymers having a lower content of polymerized ethylene oxide groups display only limited solubility in water, and hence are not useful as the water-sensitive polymer component of the present invention. Polyalkylene oxide polymers containing less than about 50% by weight of polymerized ethylene oxide are, however, useful as plasticizers or diluents.

The polyalkylene oxide polymers having a molecular weight of less than about 3,000, when used as the sole polyalkylene oxide, have been found not to impart water dispersibility to the graft copolymers, and hence, such lower molecular weight polyalkylene oxide fractions should not be included in determining the proportion of the water-soluble component present in the graft copolymer. On the other hand, such low molecular weight polyalkylene oxides (e.g., CARBOWAX 600) are useful in plasticizers or diluents.

The vinyl monomers useful in the graft copolymers of the present invention are preferably vinyl acetate and the lower alkyl-substituted acrylates or methacrylates such as methyl acrylate and ethyl acrylate. Other useful vinyl monomers include the alkyl esters of acrylic acid containing 1 to 10 carbon atoms in the alkyl portion; styrene; and vinyl esters such as vinyl propionate, vinyl butyrate, vinyl 2-ethylhexanote and the like. Use of the vinyl monomers, and in particular the vinyl acetate monomer, provides sufficient chain transfer in grafting to produce a graft copolymer which is thermally stable, moderately polar and are readily formulatable into an adhesive. The graft copolymer preferably comprises from about 40 to 85% of at least one vinyl monomer and about 15 to 60% by weight of at least one water-soluble polyalkylene oxide polymer, and most preferably contains 15 to 45% by weight of the polyalkylene oxide component(s).

While various vinyl monomers may be utilized by themselves for grafting onto the water-soluble polymer backbone, small amounts of other ethylenically unsaturated monomers may be utilized as comonomers with the vinyl monomer to improve particular properties such as water-dispersibility, adhesion, softness and the like. Monomers useful as comonomers with the vinyl monomers include 2-hydroxyethyl acrylate, N-vinyl pyrrolidone, sodium vinyl sulfonate (the sodium salt of ethylene sulfonic acid) and the alkyl esters of metharylic acid containing 1 to 8 carbon atoms in the alkyl portion. Such comonomers are generally utilized in quantities not exceeding about 40% by weight of the total graft copolymer.

The graft copolymers used herein as well as a process for the production thereof is described in U.S. Pat. No. 3,891,584 issued Jun. 24, 1975 to Ray-Chaudhuri et al., the disclosure of which is incorporated by reference.

Other polymers suitable for use herein as the base polymer in the hot melt adhesive compositions indude the water sensitive and/or biodegradable thermoplastic polymers such as, for example, hydroxybutyrate/hydroxyvalerate polymers, polylactide homo- or copolymers, hydroxypropyl cellulose, polyethyloxazoline, polyvinylmethylether, polyvinylpyrrolidone, polyamides, hydroxy functional or aliphatic polyesters, starch esters or cellulose esters having a degree of substitution (DS) less than 2.5 and the like.

Useful polymers therefore include homo- or copolymer of polylactide containing at least 20 molar percent of the lactide comonomer. The general structure of the polylactide is shown below:

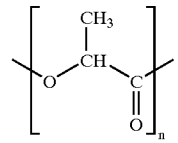

Suitable polymers for use herein have a number average molecular weight (Mn) within the range of 10,000 to 200,000.

While poly(D,L-lactide) and the meso- are essentially amorphous, poly(L-lactide) or poly(D-lactide) are crystalline in nature and have a crystalline melting point of 186° C. depending on molecular weight and stereopurity. The polymers may be prepared by ring-opening polymerization of the bimolecular cyclic ester of lactic acid with acid or base catalysts such as PbO, $SnCl_2$, $SnCl_4$, $ZnCO_2$, $SbF_5$, $Sb_2O_3$, or triethylamine using solution, precipitation or melt processes. Alternatively, they may be obtained commercially from Henley Chemicals, Inc. under the Resomere tradename; from Poly Sciences Inc. or from Cargill.

In addition to homopolymers of poly(I-lactide), poly(D,L-Iacfide), and poly(meso-lactide) suitable polymers for use herein may also be prepared by copolymerization with other lactones such as glycoside or caprolactone. Thus, poly(D, L-lactide-co-glycoside) polymers containing equimolar amounts of the lactide and glycoside components are available from Henley Chemicals as Resomer RG502, 503, 504, 505 and 506 and are suitable for use herein. In addition, poly(D,L-lactide-co-glycoside) polymers known as Resomer RG752, 755 and 756 containing 75% of the lactide component as well as the Resomer 858 polymer which contains 85% lactide are also suitable.

The use of this class of polymer in hot melt adhesives is described in U.S. Pat. Nos. 5,252,646 and 5,312,850 to Iovine et al.

Also useful herein are the linear polyesters of 3-hydroxybutyric (HB) and 3-hydroxyvaleric (HV) acids produced from the fermentation of sugars by the bacterium Alcaligenes eutrophus. The general structure is shown below:

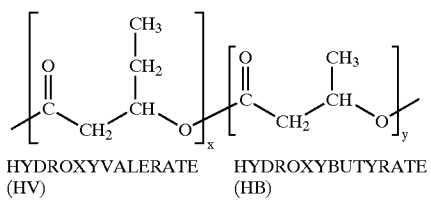

HYDROXYVALERATE (HV)   HYDROXYBUTYRATE (HB)

Polymers suitable for use herein contain 9 to 35% of the hydroxyvalerate component and were available from Zeneca under the Biopol tradename.

The use of these polymers in hot melt adhesive is described in U.S. Pat. No. 5,169,889 to Brady et al.

Also useful are the thermoplastic methylol polyesters containing repeating units of the formula:

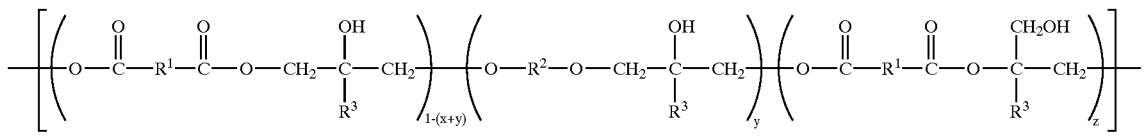

wherein each of $R^1$ and $R^2$ is individually a divalent organic moiety which is predominantly hydrocarbon, each $R^3$ is individually hydrogen or lower alkyl, y is a fraction from 0 to 0.5 and x is a fraction from about 0.05 to about 0.4.

These hydroxy functional polyesters are suitably prepared by contacting one or more diglycidyl ethers or diglycidyl esters with one or more diacids or anhydrides under conditions inducing the use of an onium catalyst sufficient to cause the acid moieties to react with epoxy moieties to form a polymer backbone having ester linkages and pendant methylol moieties. Depending upon the particular starting materials, the resulting polymer will be crystalline, semi-rystalline or amorphous in nature.

The preparation of these materials are described in greater detail in U.S. Pat. No. 5,171,820 to Mang et al. while their use in hot melt adhesives is described in U.S. Pat. No. 5,583,187.

Saturated polyesters are derived from saturated diacids and diols. These also vary in crystallinity from amorphous to highly crystalline. They are available from Huls under the Dynapol tradename.

The use of hydroxypropyl cellulose in hydrophilic hot melt adhesives has been disclosed, for example, in U.S. Pat. No. 5,356,963. Similarly, cellulose or starch esters, especially cellulose acetate and starch acetate, having a degree of substitution less than 2.5 may also be tackified with sucrose benzoate in accordance with the invention. The use of starch esters in hot melt adhesives has been disclosed in, among others, U.S. Pat. No. 5,360,845.

Other ingredients which may be present in adhesive formulations of the present invention include polar nonionic, anionic or cationic plasticizers; crystalline wax materials and stabilizers.

The hot melt adhesives of the invention may include 0 to 35% of at least one crystalline material selected from the group consisting of a compatible crystalline wax and a crystalline thermoplastic polymer. In such cases, the waxes are employed at levels of 0 to 35% by weight, to reduce the melt viscosity while improving heat resistance. The waxes used must be highly polar, containing $\geq 3\times 10^{-3}$ equiv/g of polar groups and at least one group per molecule and with a molecular weight below 500 g/mole. Higher concentrations of polar groups are necessary for higher molecular weight waxes. These polar groups include hydroxyl, amide (primary, secondary, and tertiary), sulfone, phosphate esters, sulfonamide, carbonate, urea, amine, urethane, carboxylic acid; and carboxylate salts, ureas, and sulfonate salts.

Suitable crystalline polar waxes include 12-hydroxystearamide, N-(2-hydroxy ethyl) 12-hydroxystearamide (PARICIN 220 from CasChem), stearamide (KEMAMIDE S from Witco), glycerin monostearate, sorbitan monostearate, and 12-hydroxy stearic acid. Also useful in combination with the above are the less polar waxes such as N,N'-ethylene-bis-stearamide (KEMAMIDE W-40 from Witco), hydrogenated castor oil (castor wax), oxidized synthetic waxes, and functionalized synthetic waxes such as oxidized polyethylene waxes (PETROLITE E-1040).

The crystalline component may alternatively be a crystalline hydrophobic thermoplastic polymer present in the adhesive 5 to 60%, preferably 10 to 40%. These polymers are employed in order to impart flexibility, toughness and strength. Suitable crystalline thermoplastic polymers include ethylene vinyl acetate copolymers containing about 12 to 50% vinyl acetate, ethylene acrylic acid, ethylene methyl acrylate and ethylene n-butyl acrylate copolymers as well as polylactide, caprolactone polymers and poly (hydroxy-butyrate/hydroxyvalerate), polyvinyl alcohol, linear saturated polyesters such as DYNAPOL or DYNACOLL polymers from Huls, GRILTEX from EMS-Chemie, poly (ethylene oxide) polyether amide or polyester ether block copolymers available from Atochem (PEBAX) or Hoechst Celanese (RITEFLEX) respectively, and polyamide polymers such as those available from Union Camp (UNIREZ) or Hals (VESTAMELT). The polymers added may be amorphous or crystalline, but at least 5% of a crystalline polymer is required to achieve adequate properties.

Preferred among these crystalline polymers are other polyester polymers such as those available from EMS-Chemie, Sumter, S.C., under the tradename GRILTEX, or from Huls America, Piscataway, N.J., under the tradenames DYNAPOL and DYNACOLL (lower molecular weight). Also preferred are polyamides such as those available from Union Camp, Wayne, N.J., under the UNIREZ tradename or copolyamides available from Huls under the VESTAMELT tradename and also from EMS-Chemie also under the GRILTEX name.

It may also be desirable to incorporate into the hot melt adhesive up to 20% by weight of certain other hydrophilic non-crystalline polymers such as hydroxyethyl cellulose, hydroxypropyl cellulose, polyvinyl methyl ether, polyvinylpyrrolidone, polyethyloxazoline, starch or cellulose esters, particularly the acetates with a degree of substitution less than 2.5; the latter polymers functioning to increase the water sensitivity of the adhesives which may be desired for some applications.

Other hydrophobic compatible polymers include elastomeric polymers such as styrene containing block copolymers, e.g., styrene-isoprene-styrene, epoxidized polyisoprene, styrene-butadiene-styrene, styrene-ethylene butylene-styrene, styrene-ethylene propylene styrene may also be present at levels up to about 30% by weight. Of these polymers, those based on styrene-isoprene-styrene are most preferred.

The hot melt adhesives of the present invention also comprise 0 to 45%, preferably 5 to 20% by weight of anionic, cationic or polar nonionic plasticizers which are available in either solid or liquid form.

Examples of anionic plasticizers include the sulfosuccinate salts, such as sodium dioctyl sulfosuccinate, a solid plasticizer available under the tradename CYTEC OT-100 from Cytec Industries; sulfated fatty acids such as AHCOWET RS from ICI; and EMULSIFIER K-30, a solid alkane sulfonate available from Bayer Inc.

Examples of cationic plasticizers include the fatty amine quaternary ammonium salts, such as ATLAS G-265 with HLB of 33, available from ICI; and ATLAS-G-3634A an imidazoline quaternary ammonium salt, also available from ICI.

Preferred polar nonionic liquid plasticizers including phthalate plasticizers such as dioctyl phthalate and butyl benzyl phthalate (e.g., SANTICIZER 160 from Monsanto); liquid polyesters (non-crystalline) such as DYNACOL 720 from Huls and the liquid polymeric plasticizer available from C. P. Hall; benzoate plasticizers such as 1,4-cyclohexane dimethanol dibenzoate (e.g., BENZOFLEX 352 available commercially from Velsicol), diethylene glycol/dipropylene glycol dibenzoate (e.g., BENZOFLEX 50 from Velsicol) and diethylene glycol dibenzoate where the mole fraction of hydroxyl groups which have been esterified ranges from 0.5 to 0.95 (e.g., BENZOFLEX 2-45 High Hydroxyl also from Velsicol); phosphate plasticizers such as t-butylphenyl diphenyl phosphate (e.g., SANTICIZER 154 available commercially from Monsanto); poly (ethylene glycol) with molecular weight below about 1000 and derivatives of poly(ethylene glycol) (e.g., PYCAL 94, the phenyl ether of PEG, available commercially from ICI); ethoxylated bis phenol A (e.g., MACOL 206 EM from PPG Industries); dinonyl phenol ethyoxylates (e.g., SURFONIC DNP 100 from Huntsman Chemical Corp.); liquid rosin derivatives having Ring and Ball melting points below about 60° C. such as the methyl ester of hydrogenated rosin (e.g., HERCOLYN D from Hercules); as well as vegetable and animal oils such as glycerol esters of fatty acids and polymerization products thereof. Particularly preferred plasticizers include phenyl ether of polyethylene-glycol; butyl benzyl phthalate; benzoates such as 1,4-cyclohexane dimethanol dibenzoate, diethylene glycol/dipropylene glycol dibenzoate, and diethylene glycol dibenzoate where the mole fraction of hydroxyl groups which have been esterified ranges from 0.5 to 0.95.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl4-hydroxyphenyl) propionate; n-octadecyl 3,5-di-tert-butyl-4-hydroxyphenyl) propionate; 4,4'-methlenebis (2,6-di-tert-butylphenol); 4,4'-thiobis (6-tert-butyl-o-cresol); 2,6-di-tert-butylphenol; 6-(4-hydroxyphenoxy-2,4-bis(n-octylthio)-1,3,5-triazine; di-n-octadecyl-3,5-di-tert-butyl-4-hydroxy-benzylphosphonate; 2-(n-octylthio)-ethyl 3,5-di-tert-butyl-4-hydroxybenzoate; and sorbitol hexa[3-(3,5-di-tert-butyl-4-hydroxyphenyl)-propionate]. If used, the stabilizer is present in levels of about 0.1 to 3% by weight.

In addition to the high hydroxyl number compound, optional polar tackifying resins, may be present in an amount of 0 to 40% by weight. These tackifiers will have a Ring and Ball softening point greater than 60° C. and include rosin and rosin derivatives, terpene phenolics, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) rosin esters such as glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; and (3) phenolic modified (a) terpene or (b) a-methyl styrene resins as well as the hydrogenated derivatives thereof such, for example, as the resin product resulting from the condensation, in an acidic medium of a bicyclic terpene and a phenol. Mixtures of two or more of the above described tackifying resins, as well as blends of the above resins with small amounts of (e.g., less than about 20% of the adhesive) less compatible resins may be utilized for some formulations.

Representative polar tackifiers include ionic materials such as FORAL NC available from Hercules; non-ionic materials such as FORAL AX also from Hercules; alpha methyl styrene phenolics such as URATAK 68520 from DSM Resins; rosin esters such as UNITAC R100L available from Union Camp; and, terpene phenolics such as NIREZ 300, available from Arizona Chemical.

Another tackifier is sucrose benzoate which is particularly useful due to its biodegradable and compostable character. Sucrose benzoate is preferably utilized in its alcohol soluble form wherein the sucrose is partially esterified. This grade is a light colored, clear non-crystalline solid with a softening point of about 95° C. Alternatively, the non-alcohol organic soluble grade, a water-clear, non-crystalline flake solid having a softening point of 98° C. may also be used. Both grades are available commercially from Veliscol Chemical Corporation.

Optional additives may be incorporated into the hot melt compositions in order to modify certain properties thereof. Among these additives may be included colorants such as titanium dioxide; and fillers such as talc and clay, etc.

Thus, in a preferred embodiment, the present invention is directed to hot melt adhesive compositions comprising (a) >40% by weight of a sulfonated polyester or a graft copolymer of at least one vinyl monomer and at least one polyalkylene oxide polymer; (b) 5 to 40% by weight of a high hydroxyl number compound; (c) 0 to 45% by weight of a polar nonionic, anionic or cationic plasticizer (d) 0 to 35% by weight of at least one crystalline material selected from the group consisting of a compatible crystalline wax diluent and a crystalline thermoplastic polymer, (e) and 0 to 3% by weight of a stabilizer; with the total of (a)–(e) to equal 100% by weight.

The hot melt adhesive compositions of the invention may be formulated using techniques known in the art. An exemplary procedure for preparing an adhesive according to the preferred embodiment above involves placing approximately 40% of the total high hydroxyl number compound concentration with all the polymer, wax, plasticizers and stabilizers in a jacketed mixing kettle, preferably in a jacketed heavy duty mixer, which is equipped with rotors and thereupon raising the temperature to a range of from up to about 190° C. After the compound has melted, the temperature is lowered to 150° to 165° C. Mixing and heating are continued until a smooth, homogeneous mass is obtained whereupon the remainder of the compound is thoroughly and uniformly admixed therewith.

As noted above, the hydrophilic hot melt adhesives of the invention will be formulated differently depending upon the particular end use.

The following examples are merely illustrative, and not intended to limit the scope of present claims in any manner.

EXAMPLES

In the following illustrative examples all parts are given by weight and all temperatures in degrees Celsius unless otherwise noted.

In preparing the following samples, a heavy duty mixer which had been heated to 165° C. and which was equipped with a stirring paddle was charged with 40% of the tackifying resin and/or diluent. After melting of the resins, stirring was then initiated whereupon the polyester was added slowly at 165° C. over a one-half hour period after which the temperature was lowered to 150° C. Heating and stirring were continued until a homogeneous mass was obtained whereupon the remainder of the tackifying resin and/or diluent was admixed therewith.

The samples were tested using the following procedures:

Viscosity measurements were determined after 30 minutes using a Brookfield viscometer (Spindle 27).

Some of the adhesives were also tested for thermal stability by storing at 275° F. for 24 hours. After the testing period, remove the jar, check for the following:

a. Skin
b. Dir/char particles
C. Sedimentation—partial skin precipitating and falling to the bottom of the jar.
d. Volatile char
e. Gelation—carefully examine the contents with a glass stirring rod for signs of gels or lumps.
f. Color or odor
g. Product separation—the presence of distinct layers, also known as phasing.

Water Dispersibility

The percent water dispersibility is determined using the TAPPI UM 666 test procedure. The test results show improved dispersibility of the adhesives of the present invention as compared to conventional hot melt adhesives.

The following were used in the formulations:

PARICIN 220 is a 12-hydroxystearamide wax from CasChem Inc.

SANTOVAR A is a 2,5-di(tert-amyl) hydroquinone antioxidant from Monsanto.

TNPP is a tris nonylphenyl phosphite antioxidant from GE Inc.

URATAK 68528 is an α-methyl styrene-styrene tackifier available from DSM Resins with an hydroxyl number 0 mg KOH/g.

URATAK 68520 is an α-methyl styrene phenolic tackifier available from DSM Resins with an hydroxyl number 39 mg KOH/g.

NIREZ V-2040 a is an terpene phenolic from Arizona Chemical with an hydroxyl number of 72 mg KOH/g.

STEPANOL PN-110 is an orthophthalate neopentyl glycol polyester polyol available from Stepan.

SAA-100 is a styrene allyl alcohol copolymer available from ARCO Chemical.

CYCLOFLEX 70-3566 is a polyethylene glycol grafted polyvinyl acetate polymer, containing 70% vinyl acetate and 30% polyethylene glycol, available from National Starch and Chemical Company.

Example 1

Hot melt adhesives were formulated with EASTMAN AQ 1350, a branched sulfonated polyester available from Eastman Chemical. Each sample was prepared from 50% by weight EASTMAN AQ 1350; 50% by weight of a tackifier or high hydroxyl compound as shown below in Table 1:

TABLE 1

|  | 1-1 | 1-2 | 1-3 | 1-4 | 1-5 |
| --- | --- | --- | --- | --- | --- |
| URATAK 68528 | 50 | 0 | 0 | 0 | 0 |
| STEPANOL PN 110 | 0 | 50 | 0 | 0 | 0 |
| NIREZ V-2040 | 0 | 0 | 50 | 0 | 0 |
| SAA 100 | 0 | 0 | 0 | 50 | 0 |
| URATAK 68520 | 0 | 0 | 0 | 0 | 50 |

The moisture uptake of each of the above blends was then evaluated by placing 30 grams of each blend in an oven for 24 hours at 275° F. Incompatibility was observed with sample 1-1, so this sample was discarded. Of the remaining samples, 1 gram of each was placed in a weighing tin and left there for one week. After one week the sample was weighted and the moisture uptake determined:

| Sample | % Moisture Uptake |
| --- | --- |
| 1-2 | 4.5 |
| 1-3 | 2.0 |
| 1-4 | 4.3 |
| 1-5 | 2.4 |

Example 2

Example 1 was repeated using 50% by weight of CYCLOFLEX 70-3566, instead of Eastman AQ 1350. The same tackifiers or high hydroxyl compounds, in the same amounts were used. Formulations 2-1 and 2-5 were incompatible, as judged by phase separation after 24 hours at 275° F. The moisture uptake was measured and the following results obtained:

| Sample | % Moisture Uptake |
| --- | --- |
| 2-2 | 3.5 |
| 2-3 | 1.7 |
| 2-4 | 3.0 |

The results shown above in Examples 1 and 2 show that adhesives with STEPANOL PN-110 and SAA-100 have a higher moisture uptake than those prepared with NIREZ V-2040 or URATAK 68528. URATAK 68520 was not compatible at this level with either hydrophilic base polymer. This data shows that the high hydroxyl compounds provide a boost in water sensitivity to the final adhesive formulation.

Example 3

Hot melt adhesives were formulated with EASTMAN AQ 1350. Each sample was prepared from 50% by weight EASTMAN AQ 1350; 20% by weight PARICIN 220; 0.5% by weight SANTOVAR A; and 0.5% by weight TNPP. Each formulation was prepared with 30% by weight of a tackifier or high hydroxyl compound as shown below:

TABLE 2

|  | 3-1 | 3-2 | 3-3 | 3-4 |
|---|---|---|---|---|
| SAA 100 | 30 | 0 | 0 | 0 |
| STEPANOL PN 110 | 0 | 30 | 0 | 0 |
| NIREZ V 240 | 0 | 0 | 30 | 0 |
| URATAK 68528 | 0 | 0 | 0 | 30 |
| Hydroxy Number (mg KOH/g) | 210 | 110 | 72 | 0 |

The results are shown below in Table 3:

TABLE 3

|  | 3-1 | 3-2 | 3-3 | 3-4 |
|---|---|---|---|---|
| Viscosity (cps) | | | | |
| 275° F. | 9800 | 3365 | 8000 | 6325 |
| 300° F. | 2100 | 1785 | 3850 | 3250 |
| Thermal Stability 275° F. @ 24 hrs. | | | | |
| Separation | none | none | none | none |
| Char | none | none | none | Sl. Swirl |
| Gel | none | none | none | none |
| Edge ring | none | none | none | none |
| Skin | none | none | none | none |
| Odor | mild | mild | mild | strong |
| Color | yellow/brown | light brown | brown | cream |
| Viscosity at 275° F. | 7100 | 2765 | 5590 | 5460 |
| ov (%) | −27.6 | −21.7 | −30.2 | −13.6 |
| % dispersibility | 98% | 98% | 95% | 92% |

The data in Table 3 above, show that Samples 3-1 and 3-2, both comprising a compound with hydroxyl number greater than 100 mg KOH/g have superior dispersibility to adhesives formulated with conventional tackifiers, Samples 3-3 and 3-4 (prepared with terpene phenolic and α-methyl styrene-styrene, respectively).

Example 4

Hot melt adhesives were formulated with CYCLOFLEX 70-3566, a polyethylene glycol grafted polyvinyl acetate polymer, available from National Starch and Chemical Company. Each sample was prepared from 50% by weight CYCLOFLEX 70-3566; 20% by weight PARICIN 220; 0.5% by weight SANTOVAR A; and 0.5% by weight TNPP. Each formulation was prepared with 30% by weight of a tackifier or high hydroxyl compound as shown below in Table 4:

TABLE 4

|  | 4-1 | 4-2 | 4-3 | 4-4 |
|---|---|---|---|---|
| SM 100 | 30 | 0 | 0 | 0 |
| STEPANOL PN 110 | 0 | 30 | 0 | 0 |
| NIREZ V-2040 | 0 | 0 | 30 | 0 |
| URATAK 68528 | 0 | 0 | 0 | 30 |
| Hydroxyl Number (mg KOH/g) | 210 | 110 | 72 | 0 |

The results are shown below in Table 5:

TABLE 5

|  | 4-1 | 4-2 | 4-3 | 4-4 |
|---|---|---|---|---|
| Viscosity (cps) | | | | |
| 275° F. | 1625 | 1160 | 2150 | 2140 |
| 300° F. | 875 | 700 | 1120 | 1050 |
| Thermal Stability 275° F. @ 24 hrs. | | | | |
| Separation/Char/Gel | none | sl. Swirl | sl. Swirl | separation |
| Edge ring/skin | none | none | none | none |
| Odor | mild | mild | mild | mild |
| Color | light brown | brown | light brown | brown |
| Viscosity at 275° F. | 1840 | 1195 | 2075 | — |
| ov (%) | +13.2 | +3.0 | +3.71 | — |
| % dispersibility | 97.8% | 97.6% | 94% | 88% |

The data in Table 5 above, show that Samples 4-1 and 4-2, both comprising a compound with hydroxyl number greater than 100 mg KOH/g have superior dispersibility to adhesives formulated with conventional tackifiers, Samples 4-3 and 4-4 (prepared with terpene phenolic and α-methyl styrene-styrene, respectively). In addition, Sample 4-4, prepared with α-methyl styrene-styrene was unstable; it exhibited phase separation at 275° F.

We claim:

1. A water ssensitive hot melt adhesive composition comprising a polymeric component and an amount of a solid hydroxyl polymer effective to improve the dispersibility of the hot melt adhesive in water, wherein said polymeric component comprises a sulfonated polyester or a graft copolymer of at least one vinyl monomer and at least one polyalkylene oxide polymer and wherein said solid hydroxyl polymer has an hydroxyl number greater then 100 mg KOH/g, and is present in the adhesive in an amount greater than 10% by weight.

2. The hot melt adhesive of claim 1 further comprising a plasticizer; at least one crystalline material selected from the group consisting of a compatible crystalline wax diluent and a crystalline thermoplastic polymer; and/or a stabilizer.

3. The hot melt adhesive of claim 1 wherein the hydroxyl polymer is selected from the group consisting of styrene allyl copolymers, orthophthalate neopentyl glycol polyester polyol, and combinations thereof.

4. The hot melt adhesive of claim 1 wherein the polymer component comprises a sulfonated polyester.

5. The hot melt adhesive composition of claim 4 wherein said sulfonated polyester condensation polymer comprises the reaction product of (a) at least one difunctional dicarboxylic acid or the corresponding methyl esters which is not a sulphomonomer;

(b) 2 to 25 mole percent of at least one sulfomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

(c) at least one difunctional reactant selected from a glycol or a mixture of a glycol and diamine having two —NRH groups, the glycol containing two —C(R$^1$)$_2$— OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbons atoms;

(d) 0 to 40 mole percent of a difunctional reactant selected from hydroxycarboxylic acids having one —C(R)$_2$—

OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (e) 0 to 40 mole percent of a multifunctional reactant containing at least three functional groups selected from the group consisting of hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of the equivalents of base divided by the equivalents of acid is between 0.5 and 2.

6. The hot melt adhesive of claim 1 wherein the polymer component comprises a graft copolymer of at least one vinyl monomer and at least one polyalkylene oxide polymer.

7. The hot melt adhesive composition of claim 6 wherein the base polymer component comprises about 40 to 85% by weight of said at least one vinyl monomer and about 15 to 60% by weight of said at least one polyalkylene oxide polymer.

8. The hot melt adhesive of claim 6 wherein the base polymer component is a polyethylene glycol grafted polyvinyl acetate polymer.

9. The hot melt adhesive of claim 2 wherein the plasticizer is selected from the group consisting of sulfosuccinate salts, sodium dioctyl sulfosuccinate, sulfated fatty acids, alkane sulfonate, and combinations thereof.

10. The hot melt adhesive composition of claim 2 wherein the plasticizer is selected from the group consisting of fatty amine quaternary ammonium salts, imidazoline quaternary ammonium salts, and combinations thereof.

11. The hot melt adhesive composition of claim 2 wherein the plasticizer is selected from the group consisting of phthalate plasticizers, benzoate plasticizers, aliphatic liquid polyesters, phosphate plasticizers, poly(ethylene glycol) with number average molecular weight below about 1000; ethoxylates of phenol, bisphenol A or mono or di-alkylated phenol, liquid rosin plasticizers having Ring and Ball melting points below about 60° C., and vegetable and animal oils.

12. The hot melt adhesive of claim 2 wherein the crystalline polar wax diluent is selected from the group consisting of 12-hydroxystearamide wax, N-(2-hydroxy ethyl) 12-hydroxystearamide and stearamide.

13. The hot melt adhesive of claim 12 further comprising a less polar wax selected from the group consisting of N,N'-ethylene-bis-stearamide, hydrogenated castor oil, oxidized synthetic waxes, and functionalized synthetic wax.

14. The hot melt adhesive of claim 2 wherein the crystalline thermoplastic polymer is selected from the group consisting of ethylene vinyl acetate copolymers containing about 12 to 50% vinyl acetate, ethylene acrylic acid, ethylene methyl acrylate, ethylene n-butyl acrylate copolymers, polylactide and caprolactone polymers, poly(hydroxybutyrate/hydroxyvalerate), polyvinyl alcohol, poly(ethylene oxide), saturated polyesters, polyether amide and polyether ester block copolymers.

15. The hot melt adhesive of claim 1 comprising greater than 40% by weight of said polymeric component and 10 to 40% by weight of said hydroxyl polymer.

\* \* \* \* \*